United States Patent [19]

Fabbri

[11] Patent Number: 4,914,993
[45] Date of Patent: Apr. 10, 1990

[54] DEVICE FOR CONTROLLING BAR FACING ON AUTOMATIC LATHES FOR MACHINING BARS

[75] Inventor: Vladimiro Fabbri, Faenza, Italy
[73] Assignee: I.E.M.C.A. S.P.A., Faenza Ra, Italy
[21] Appl. No.: 255,698
[22] Filed: Oct. 11, 1988

[30] Foreign Application Priority Data

Oct. 16, 1987 [IT] Italy .................................. 3656 A/87

[51] Int. Cl.$^4$ .............................................. B23B 13/02
[52] U.S. Cl. ........................................ 82/127; 82/126; 414/18
[58] Field of Search ............ 82/2 A, 2.5, 2.7, DIG. 5; 414/18

[56] References Cited

U.S. PATENT DOCUMENTS

| | | | |
|---|---|---|---|
| 3,131,587 | 5/1964 | Spohn et al. | 82/2.7 |
| 3,205,737 | 9/1965 | Ogren | 82/2.5 |
| 3,602,075 | 8/1971 | Waefler | 82/2.5 |
| 3,612,298 | 10/1971 | Azuma | 82/2.5 |
| 3,874,520 | 4/1975 | Scheler | 82/2.5 |
| 3,875,830 | 4/1975 | Lechot | 82/2.7 |
| 3,918,594 | 11/1975 | Durst et al. | 82/2.5 |
| 4,019,411 | 4/1977 | Bohn et al. | 82/2.7 |
| 4,068,546 | 1/1978 | Werkmeister | 82/2.5 |

*Primary Examiner*—William Terrell
*Attorney, Agent, or Firm*—Guido Modiano; Albert Josif

[57] ABSTRACT

The device for controlling the facing of a bar on an automatic lathe for machining bars, comprises a bar-pusher actuated by a traction element to cause the advancement of a bar towards the lathe, a carriage slideable on a guide parallel to the traction element, a hook for intercepting the carriage in a bar loading position, a clutch adapted to keep the bar-pusher rigidly associated with the carriage when the carriage is free to slide on the guide and to allow the bar-pusher to move with respect to the carriage when the carriage is intercepted. The hook is controlled by a sensor adapted to detect the end of a bar to be machined at the entry point of the lathe and to control the hook during free sliding of the carriage. A further sensor is provided to actuate the bar-pusher in the bar facing position.

3 Claims, 2 Drawing Sheets

DEVICE FOR CONTROLLING BAR FACING ON AUTOMATIC LATHES FOR MACHINING BARS

BACKGROUND OF THE INVENTION

The present invention relates to a device for controlling bar facing on automatic lathes for machining bars.

Since the initial portion of a bar to be machined usually has irregularities, said initial portion is removed by means of an operation called "facing" before the bar is machined.

SUMMARY OF THE INVENTION

The technical aim of the present invention is to provide a device to be applied to a bar loader, by means of which it is possible to determine exactly the point at which the bar must be stopped to allow the facing by the tool of the lathe.

Within this aim, an object of the present invention is to provide a device which allows to recover any variations in length occurring among the various bars.

This aim and this object are achieved by a device which is characterized in that it comprises a bar-pusher actuated by an advancement element to cause advancement of a bar to be machined towards a lathe, a carriage slideable on a guide parallel to said advancement element, means for intercepting said carriage in the bar loading position, friction means adapted to keep said bar pusher rigidly coupled to said carriage when said carriage is free to slide on said guide and to allow said bar pusher to move with respect to said carriage when said carriage is intercepted, said interception means being controlled by a sensor adapted to detect an end of a bar to be faced upon entry of said bar in a lathe and to control said interception means in the position of free sliding of the carriage, a sensor adapted to control said advancement in the bar facing position being furthermore provided.

BRIEF DESCRIPTION OF THE DRAWINGS

Further characteristics and advantages of the invention will become apparent from the following description of a preferred embodiment, illustrated only by way of non-limitative example in the accompanying drawings, wherein.

DESCRIPTION OF THE PREFERRED EMBODIMENTS

Figure 1:
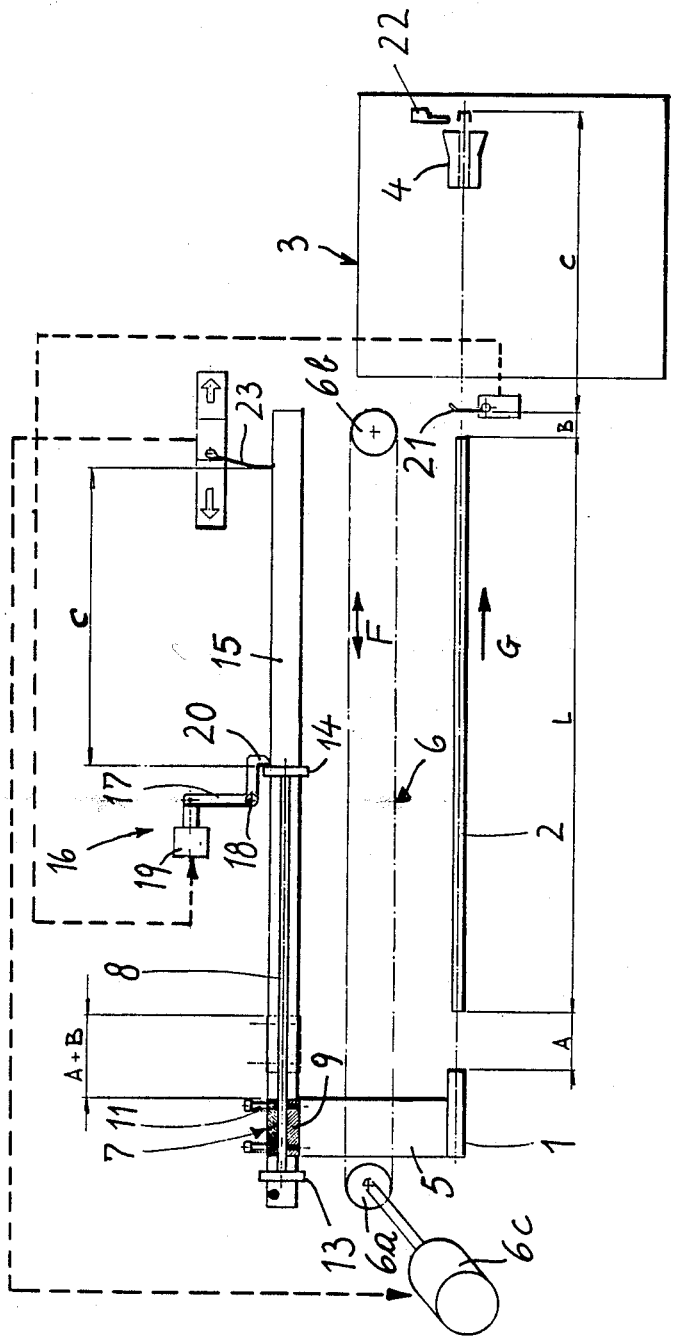
FIG. 1 is a partially schematic view of a control device in an initial position.

With reference to the above described figures, the reference numeral 1 indicates a bar-pusher of a bar loader 2, which individually pushes bars along a guide and then through the tubular chuck of a lathe 3, where they are gripped by a collet 4.

The guide, which is not illustrated in the drawings since it is conventional in structure, is constituted for example by a pair of longitudinal and opposite shells which define a channel in which the bar slides axially, and a longitudinal sot through which there moves the bracket 5 for the coupling of the bar-pusher 1 to a chain 6 constituting the bar-pusher advancement element.

The chain 6 extends parallel to the bar 2 around a pair of toothed wheels 6a, 6b and is actuated by a driving unit 6c with advancement motion in a direction F from an initial position (coinciding with the one in which the bar-pusher 1 is shifted to the left in FIG. 1) towards the lathe 3 and back to the initial position when the facing operation has been completed.

The bracket 5 has a clutch mechanism, generally indicated by the reference numeral 7, which is capable of sliding with friction on a rod 8 parallel to the advancement chain 6. The mechanism 7 is constituted by a jaw 9, fixed to the bracket 5, and by a movable jaw 10 which is guided with respect to the fixed jaw by bolts 11 and is biased towards the fixed jaw by springs 12 which interact between the heads of the bolts 11 and the movable jaw 10.

The jaws 9, 10 have opposite semicircular grooves which cooperate to form an engagement channel for the rod 8. Naturally between the adjacent faces of the jaws an interspace is defined to ensure that the rod 8 is clamped therebetween consequent to the action of the springs 12.

The rod 8 has its opposite ends fixed to two shoes constituted by plates 13, 14 which are slideably coupled to a guide or rail 15, extending parallel to the chain 6. In practice therefore the rod 8 and the plates 13, 14 form a carriage, which slides along the rail 15.

The movement of the carriage 13, 14 on the rail 15 is interceptable by means of a ratchet device 16 composed of a lever 17, pivoted at an axis 18 to fixed parts of the frame of the device and comprising two arms arranged mutually orthogonally. One of said arms is connected to an actuator 19, e.g. of the electromechanical type, while the other arm is shaped to define a hook 20 adapted to engage, in one position of the lever 17, against the plate 14 to intercept the carriage.

The actuator 19 is controlled by a sensor 21 located proximate to the entry of the lathe 3 to actuate the hook 20 in the free stroke position of the carriage 13, 14.

The operation of the described device is as follows.

At the beginning of the operating cycle the carriage 13, 14 is in the position of FIG. 1, i.e. at the left end of the rail 15, retained by the hook 20.

In this position the bar-pusher 1 is at a distance from the sensor 21 greater than the length L of the bar 2 to be machined, so as to allow the insertion of the bar into the guide of the loader. After inserting the bar into the guide, "A" is the distance between the left end of the bar and the bar-pusher 1, and "B" is the distance between the opposite end and the sensor 21 (see FIG. 1).

Figure 2:
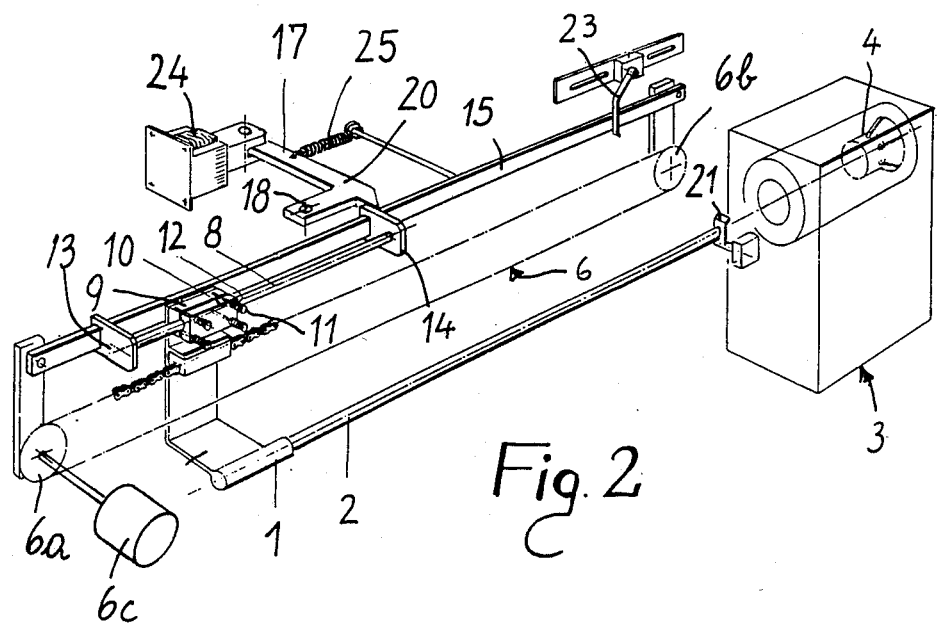
FIGS. 2 and 3 are perspective views of the device in two successive operating positions corresponding to the position for eliminating variations in the length of the bar and respectively, the position for facing the bar.

Upon the actuation of the chain 6, as the carriage 13, 14 is retained by the hook 20, the bar-pusher 1 slides with friction on the rod 8 to move first into contact with the left end of the bar 2, thus annulling the distance A, and then pushes the bar forwards in the direction G until its right end reaches the sensor 21, thus annulling the distance B. At this point (see FIG. 2) further advancement of the bar-pusher 1, which up to this point has traversed the total path A+B determines activation of the sensor 21 which controls release of the ratchet 16 by disengaging the hook 20 from the plate 14. In this manner the sliding of the jaws 9,10 on the rod 8 is interrupted and the movement of the carriage 13,14 along the rail 15 is started.

Figure 3:
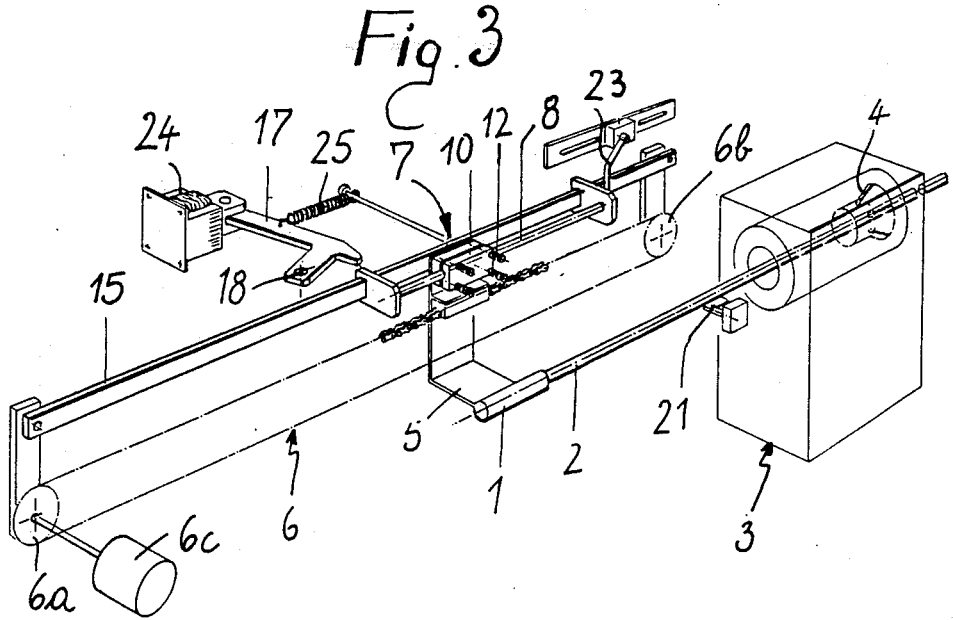

When the carriage has traversed the distance C, which corresponds to the distance between the sensor 21 and the position in which the front end of the bar 2 is positioned in front of the tool 22 (i.e., the bar facing position of FIG. 3), the carriage 13, 14 activates a further sensor 23 which causes stopping of the chain and therefore of the carriage to allow the lathe to face the bar. Upon completion of the facing operation the bar is caused to advance by the bar-pusher for subsequent machining.

As can be seen from the above description, the relative movement between the jaws 9, 10 and the carriage 13,14 during the first step of advancement of the carriage allows to recover the bar portion A+B regardless of the length of said portion and therefore to annul length variations of the bar being machined. This allows to simultaneously start the bar 2 and the carriage 13,14 and to stop the bar when the same has traversed a portion equal to the stroke C of the carriage which can be adjusted as required by varying the longitudinal position of the sensor 23.

The described invention perfectly achieves the intended aim and object. In its practical embodiment numerous modifications and variations, all within the scope of the inventive concept, are possible. For example the actuator 19 may be constituted by an electromagnet 24 cooperating with a return spring 25 adapted to return the hook 20 to the carriage interception position as soon as the sensor 21 is deactivated.

I claim:

1. Device for controlling the facing position of a bar on an automatic lathe for machining bars comprising
    an advancement element arranged for moving in an advancing direction toward said lathe;
    a bar pusher rigidly connected to said advancement element;
    a guide parallel to said advancing direction;
    a carriage slidingly supported on said guide;
    rod means arranged on said carriage and extending parallel to said advancing direction;
    intercepting means controlled between an interception position of said carriage corresponding to a bar loading position and a release position;
    clutch means for frictionally connecting said bar-pusher to said rod means so as to cause entrainment of said carriage along said guide toward said lathe when said intercepting means is in said release position and to allow sliding of said bar-pusher relative to said rod means when said intercepting means are in said interception position;
    first sensor means arranged to detect the front end of a bar to be machined at a predetermined distance from said facing position of a bar and to activate said intercepting means from said interception position to said release position; and
    second sensor means arranged along said guide and controlling stopping of said advancement element when said front end has covered said predetermined distance.

2. Device according to claim 1 wherein said advancing element comprises a chain wound on a pair of toothed wheels and wherein said bar-pusher is connected to said chain by means of a bracket on which said clutch means are mounted.

3. Device according to claim 2 wherein said clutch means comprises a fixed jaw connected to said bracket and a movable jaw guided with respect to said fixed jaw, said jaws having opposite grooves forming a channel for engagement of said rod means, spring means being provided for urging said movable jaw against said fixed jaws to frictionally retain said rod means therebetween.

* * * * *